US012634262B2

(12) United States Patent
Min et al.

(10) Patent No.: US 12,634,262 B2
(45) Date of Patent: May 19, 2026

(54) METHOD FOR CONTROLLING ACCESS OF EXTERNAL DEVICES TO IN-VEHICLE NETWORK AND GATEWAY THEREFOR

(71) Applicants: Hyundai Motor Company, Seoul (KR); Kia Corporation, Seoul (KR)

(72) Inventors: Young Bin Min, Busan (KR); Seung Wook Park, Yongin-si (KR); Yousik Lee, Suwon-si (KR)

(73) Assignees: HYUNDAI MOTOR, Seoul (KR); KIA CORPORATION, Seoul (KR)

( * ) Notice: Subject to any disclaimer, the term of this patent is extended or adjusted under 35 U.S.C. 154(b) by 322 days.

(21) Appl. No.: 18/371,701

(22) Filed: Sep. 22, 2023

(65) Prior Publication Data
US 2024/0283777 A1     Aug. 22, 2024

(30) Foreign Application Priority Data
Feb. 20, 2023     (KR) ........................ 10-2023-0021997

(51) Int. Cl.
H04L 29/06 (2006.01)
H04L 9/32 (2006.01)
(Continued)

(52) U.S. Cl.
CPC ........ H04L 63/0281 (2013.01); H04L 9/3247 (2013.01); H04L 9/3268 (2013.01);
(Continued)

(58) Field of Classification Search
CPC . H04L 63/0281; H04L 9/3247; H04L 9/3268; H04L 9/3271; H04L 63/105;
(Continued)

(56) References Cited

U.S. PATENT DOCUMENTS

| 10,200,371 B2 * | 2/2019 | Darnell | ................. | H04L 9/3234 |
| 10,764,040 B2 * | 9/2020 | Kumar | .................... | H04W 4/06 |
| (Continued) | | | | |

FOREIGN PATENT DOCUMENTS

| CN | 102025500 A | * | 4/2011 | .............. | B60L 53/18 |
| CN | 102904896 A | * | 1/2013 | ............ | H04W 12/02 |
| (Continued) | | | | | |

OTHER PUBLICATIONS

Quang & Feng , Review of Secure Communication Approaches For in-Vehicle Network, Mar. 18, 2018, Tongi University, Shanghai, pp. 879-894. (Year: 2018).*

*Primary Examiner* — Sher A Khan
(74) *Attorney, Agent, or Firm* — Morgan, Lewis & Bockius LLP

(57) ABSTRACT
A gateway may perform a challenge-response authentication process on an external device which is new and external to a vehicle connected to a vehicle access interface, based on a public key of the vehicle manufacturer and a certificate of the external device. The gateway may associate one or more roles in a role-permissions database stored in a secure repository with an identifier of the external device, based on a role indicator obtained from an extended field of the external device's certificate. The gateway may control the routing of communication traffic from the external device to a destination which is the in-vehicle network based on permissions mapped to one or more roles in the role-permissions database.

13 Claims, 4 Drawing Sheets

(51) Int. Cl.
    *H04L 9/40*           (2022.01)
    *H04L 67/12*         (2022.01)

(52) U.S. Cl.
    CPC .......... *H04L 9/3271* (2013.01); *H04L 63/105*
           (2013.01); *H04L 67/12* (2013.01)

(58) Field of Classification Search
    CPC ... H04L 67/12; H04L 63/0823; H04L 63/101;
               H04L 2209/84; H04L 63/102; H04L
                      9/0891; H04L 9/3265
    See application file for complete search history.

(56)              References Cited

U.S. PATENT DOCUMENTS

| | | | | |
|---|---|---|---|---|
| 2003/0159041 | A1* | 8/2003 | Yokota | H04L 9/3271 |
| | | | | 713/168 |
| 2013/0116892 | A1* | 5/2013 | Wu | B60R 25/09 |
| | | | | 701/45 |
| 2014/0150090 | A1* | 5/2014 | Cicala | G06F 21/44 |
| | | | | 726/19 |
| 2016/0035147 | A1* | 2/2016 | Huang | H04L 9/3271 |
| | | | | 701/31.4 |
| 2017/0310674 | A1* | 10/2017 | Markham | H04W 12/04 |
| 2017/0339115 | A1* | 11/2017 | Cho | H04W 12/062 |
| 2017/0352210 | A1* | 12/2017 | Maiwand | G07C 9/00571 |
| 2018/0295518 | A1* | 10/2018 | Alloche | H04L 9/3268 |
| 2018/0304702 | A1* | 10/2018 | Urano | H04B 1/3822 |
| 2019/0210560 | A1* | 7/2019 | Decia | G07C 9/00 |
| 2019/0281052 | A1* | 9/2019 | Lekkas | H04L 9/14 |
| 2020/0126324 | A1* | 4/2020 | Hutchins | G07C 5/0808 |
| 2021/0092019 | A1* | 3/2021 | Fang | H04L 41/28 |
| 2021/0370877 | A1* | 12/2021 | Peterson | B60R 16/023 |
| 2023/0162544 | A1* | 5/2023 | Hua | H04W 12/069 |
| | | | | 340/5.72 |

FOREIGN PATENT DOCUMENTS

| | | | | | |
|---|---|---|---|---|---|
| CN | 106209770 | A | * | 12/2016 | H04L 63/123 |
| CN | 116390092 | A | * | 7/2023 | H04W 12/084 |
| DE | 102018131480 | B4 | * | 10/2024 | H04M 15/8214 |
| EP | 4306379 | A1 | * | 1/2024 | B60W 50/00 |
| JP | 2013142963 | A | * | 7/2013 | |
| JP | 2018019415 | A | * | 2/2018 | |
| JP | 2019183504 | A | * | 10/2019 | |
| KR | 20210049603 | A | * | 5/2021 | H04L 9/3268 |
| KR | 20240078024 | A | * | 6/2024 | H04L 9/3268 |
| WO | WO-2018044285 | A1 | * | 3/2018 | G06F 21/604 |

\* cited by examiner

METHOD FOR CONTROLLING ACCESS OF EXTERNAL DEVICES TO IN-VEHICLE NETWORK AND GATEWAY THEREFOR

CROSS-REFERENCE TO RELATED APPLICATIONS

The present application claims priority to Korean Patent Application No. 10-2023-0021997, filed Feb. 20, 2023, the entire contents of which is incorporated herein for all purposes by this reference.

BACKGROUND OF THE PRESENT DISCLOSURE

Field of the Present Disclosure

The present disclosure relates to security for an in-vehicle network. More particularly, the present disclosure relates to access control for external devices attempting to access an in-vehicle network.

Description of Related Art

The statements in the present section merely provide background information related to the present disclosure and do not necessarily form related art.

The rapid growth and connectivity of electronic control units in vehicles have increased safety concerns and the potential for external hacking. In particular, communication protocols commonly employed in in-vehicle networks use a common transmission medium (e.g., bus) over which messages are broadcast between network nodes, and these communication protocols may be vulnerable to spoofing the identity of other nodes on the network, e.g., vulnerable to sending messages with modified sender fields to make them appear to originate from other nodes on the network.

To verify the integrity of messages and the authenticity of the origin of messages in an in-vehicle network, an electronic control unit having a considerable level of processing power is required to take advantage of an asymmetric encryption algorithm used in general network communications. Electronic control units in vehicles are typically implemented as dedicated control devices with limited processing power, making it impractical to use asymmetric encryption algorithms for authentication in most cases.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an access control technique for an in-vehicle network with a gateway controlling traffic from access devices destined for the in-vehicle network based on roles bound to certificates of access devices outside the vehicle. A gateway is an electronic device provided in a vehicle to manage communications between different component devices within the vehicle and entities outside the vehicle, such as electronic devices, remote servers or other vehicles. A secure gateway can have significant processing power compared to a typical electronic control unit.

According to at least an exemplary embodiment of the present disclosure, the present disclosure provides a gateway for managing security for an in-vehicle network. The gateway includes a secure repository holding a public key and a role-permissions database of a vehicle manufacturer and further includes at least one processor configured to perform routing of communication traffic between a vehicle access interface and the in-vehicle network.

At least one processor may be configured to perform a challenge-response authentication process on an external device which is new and external to a vehicle and connected to the vehicle access interface, based on the public key of the vehicle manufacturer and a certificate of the external device. At least one processor may be configured to associate one or more roles in the role-permissions database with an identifier of the external device, based on a role indicator obtained from an extended field of the certificate of the external device.

At least one processor may be configured to control the routing of the communication traffic departing from the external device and headed to the in-vehicle network based on permissions mapped to one or more roles in the role-permissions database. For example, at least one processor may be configured to block the routing of the communication traffic from the external device to unpermitted domains and allow the routing of the communication traffic to relevant domains, based on permissions mapped to one or more roles of the external device.

At least one processor may be configured to associate one or more roles with the identifier of the external device to subsequently distribute, to electronic control units (ECUs) on the in-vehicle network, (1) the identifier and the role indicator or (2) the identifier and the one or more roles of the external device, for causing the ECUs to update an ECU role-permissions database to be used for controlling access of the ECUs to the communication traffic.

The certificate of the external device may include a digital signature signed with a private key of the vehicle manufacturer. Alternatively, the certificate of the external device may include a digital signature signed with a private key of a device manufacturer that produced the external device, wherein the device manufacturer and the vehicle manufacturer establish a chain of trust.

According to another exemplary embodiment of the present disclosure, the present disclosure provides a method performed by a gateway for routing communication traffic between a vehicle access interface and an in-vehicle network. The method includes detecting an external device which is new and external to a vehicle and connected to the vehicle access interface and performing a challenge-response authentication process on the external device based on the public key of the vehicle manufacturer and a certificate of the external device. The method further includes obtaining a role indicator from an extended field of the certificate of the external device and associating, based on the role indicator, one or more roles in the role-permissions database with an identifier of the external device. The method further includes controlling the routing of the communication traffic departing from the external device and headed to the in-vehicle network based on permissions mapped to one or more roles in the role-permissions database.

According to various aspects of the present disclosure, the present disclosure provides a vehicle security system including a plurality of electronic control units and a gateway. The electronic control units are connected to one or more buses forming an in-vehicle network. The gateway manages communications between the electronic control units and an external network which is external to a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
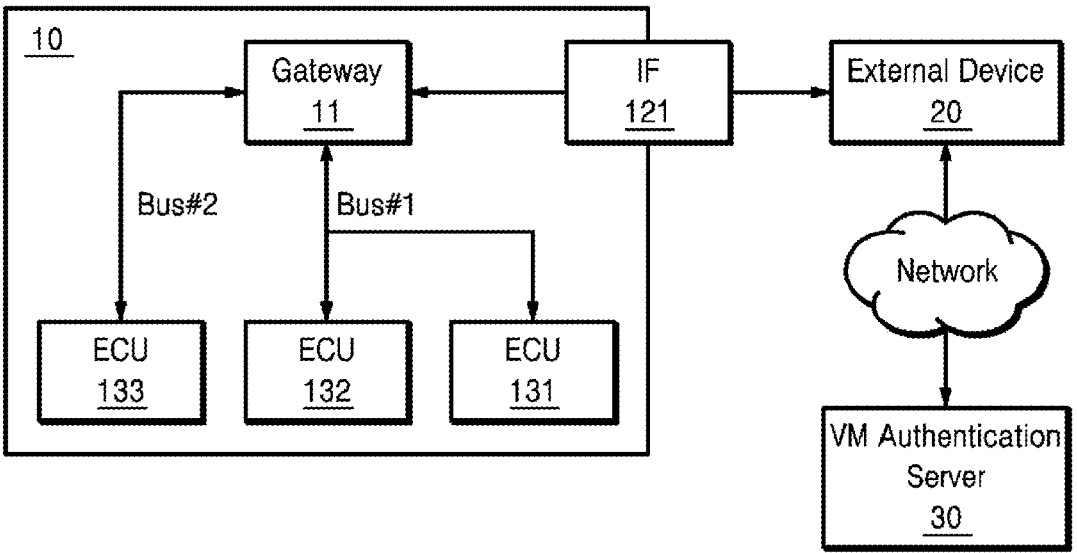
FIG. 1 is a conceptual diagram illustrating a vehicle security system for controlling access of external devices to an in-vehicle network, according to at least an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the following description, like reference numerals designate like elements, although the elements are shown in different drawings. Furthermore, the following description of various exemplary embodiments will omit for clarity and for brevity, a detailed description of related known components and functions when considered to obscure the subject of the present disclosure.

Various ordinal numbers or alpha codes such as first, second, A, B, a), b), etc., are prefixed solely to differentiate one component from the other but not to imply or suggest the substances, order, or sequence of the components. Throughout the present specification, when a part "includes" or "comprises" a component, the part is meant to further include other components, to not exclude thereof unless specifically stated to the contrary. The terms such as "unit," "module," and the like refer to units in which at least one function or operation is processed and refer to what may be implemented by hardware, software, or a combination thereof.

FIG. 1 is a conceptual diagram illustrating a vehicle security system 10 for controlling access of external devices to an in-vehicle network, according to at least an exemplary embodiment of the present disclosure.

The vehicle security system 10 includes a gateway 11 and a plurality of electronic control units (ECUs) 131, 132, 133. In FIG. 1, only three ECUs 131, 132, 133 are shown for simplicity but the present invention is not limited thereto. Also shown in FIG. 1 are the ECUs 131, 132 communicating with the gateway 11 via a bus BUS #1 and the ECU 133 communicating with the gateway 11 via a bus BUS #2. Here, the bus BUS1 #may be, for example, a CAN bus, and the bus BUS #2 may be another type of bus supported by the gateway 11, for example, a LIN bus. For ease of illustration of the principles of the present disclosure, FIG. 1 further illustrates an external device 20, which may be a variety of devices attempting to gain access to the in-vehicle network. The external device 20 may include, for example, a consumer electronic device such as a laptop, tablet, smartphone, an Internet-of-Things (IoT) device, a diagnostic tool, an insurance dongle, etc.

The Electronic Control Unit (ECU) is an electronic device that drives various systems, such as a powertrain, seats, mirrors, windows, multimedia systems, brake systems, safety systems (such as airbags), advanced driving assistance (ADAS) mechanisms, sensor/actuator platforms, and the like.

The gateway 11 is a data exchange hub in an in-vehicle network that can route network data between different types of buses, such as Control Area Network (CAN), Local Interconnect Network (LIN), Media Oriented Systems Transport (MOST), FlexRay, Ethernet, etc. The gateway 11 may be responsible for protocol conversion between the different types of buses and may be involved in network management of the respective network buses.

The gateway 11 may interact with the outside world through a vehicle access interface 121 (e.g., OBD-II port, USB port, wireless communication ports etc.) and may be responsible for forwarding and controlling traffic or messages to/from the outside network (or the outside world), defending against potential risks from the outside world to the in-vehicle network.

The vehicle security system 10 of the present disclosure employs defensive techniques for enhanced security for the in-vehicle network through two levels of authentication methods: The first level is the application of public key authentication techniques between the external device 20 and the gateway 11, and the second level is the application of role-based access control (RBAC) techniques to the gateway 11 and the individual ECUs 131, 132, 133, the RBAC techniques using roles bound to the certificate of the external device 20.

The vehicle manufacturer's (VM) authentication server 30 is configured as a public key certification authority (CA) for external devices which may be connected to a vehicle access interface. The VM authentication server 30 may hold its private key and load the corresponding public key (or a CA certificate including the present public key) into a secure repository, such as a trusted platform module (TPM) or hardware security module (HSM), on each gateway of each vehicle.

For respective external devices which may be connected to the vehicle access interface, the vehicle manufacturer may predefine the permissions required for the external devices to perform their intended functions or roles. The vehicle manufacturer may be configured to generate and manage a role-permissions database that defines predefined roles (which may be assigned by each vehicle) to external devices and the permissions mapped to those roles, and load the role-permissions database into the gateways onboard its produced vehicles and optionally into the ECUs, or distribute the role-permissions database via OTA. To the present end, vehicle manufacturers can proactively perform a risk assessment that considers their level of trust in various external devices and device manufacturers, as well as the likelihood that external devices pose a security or safety risk to the vehicle.

Figure 2:
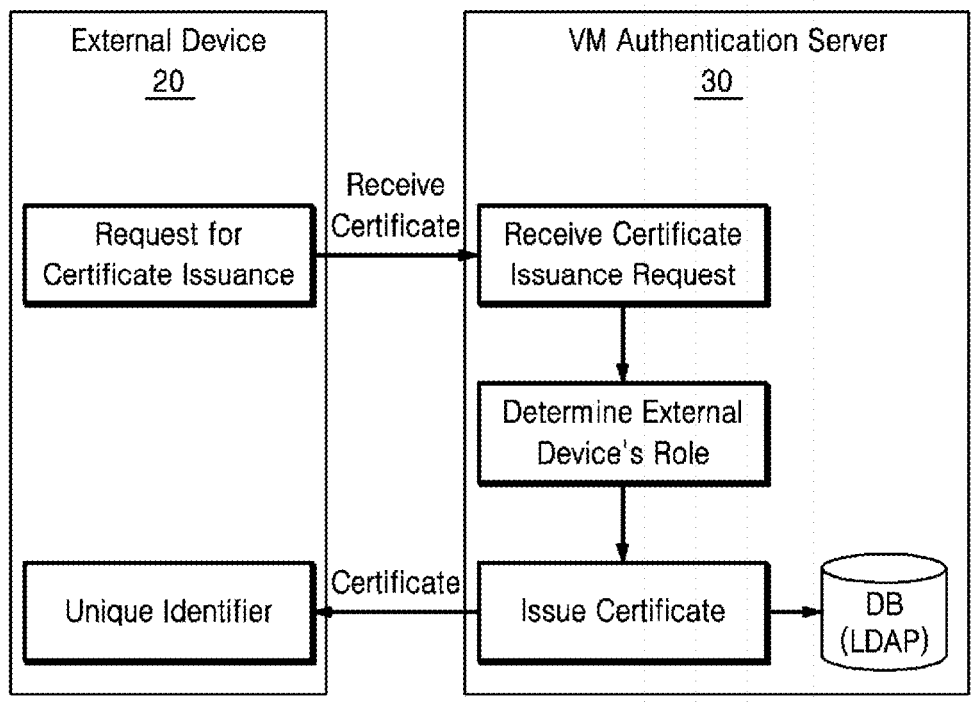
FIG. 2 is a flowchart of a procedure for a vehicle manufacturer's authentication server to issue an external device a device certificate bound to its role, according to at least an exemplary embodiment of the present disclosure.

FIG. 2 is a flowchart of a procedure for the vehicle manufacturer's (VM) authentication server 30 to issue the external device 20 a device certificate bound to its role, according to at least an exemplary embodiment of the present disclosure.

The external device 20 may send a certificate issuance request that includes its identifier (ID) to the VM authentication server 30. In response to the certificate issuance request, the authentication server 30 may be configured to determine a role for the external device 20 and issue a device certificate bound to the role. For example, the authentication server 30 may be configured to generate an asymmetric key pair (private key and public key) for the external device 20, and utilize its private key to digitally sign the device certificate that includes the public key and device ID. The device certificate may include an extension field that includes a role indicator indicating one or more roles specified or authorized by the vehicle manufacturer for the external device (product). Such a device certificate may use an X.509 certificate structure.

Instead of issuing certificates directly to external devices, the vehicle manufacturer may also function as a root CA that issues certificates digitally signed with a private key of the vehicle manufacturer to external device manufacturers. The device manufacturer's server may then function as a CA for external devices it produces, based on certificates issued by the vehicle manufacturer. Thus, the VM authentication server 30 and the device manufacturer's server may establish a chain of trust. The device manufacturer may be configured to generate an asymmetric key pair (private key and public key) for each external device produced, and utilize a private key of the device manufacturer to digitally sign the device certificate including the public key and device ID. Such a device certificate may include an extension field that includes a role indicator indicating the role authorized by the vehicle manufacturer for the external device (product).

Accordingly, the external device 20 that connects to the vehicle access interface may have its unique public/private key pair and corresponding device certificate. When the device certificate is issued by the device manufacturer, the external device may be further provided with the device manufacturer's certificate issued from the vehicle manufacturer. The external device 20 may use trusted storage (e.g., memory within a TPM or HSM) to preserve its private key.

Figure 3:
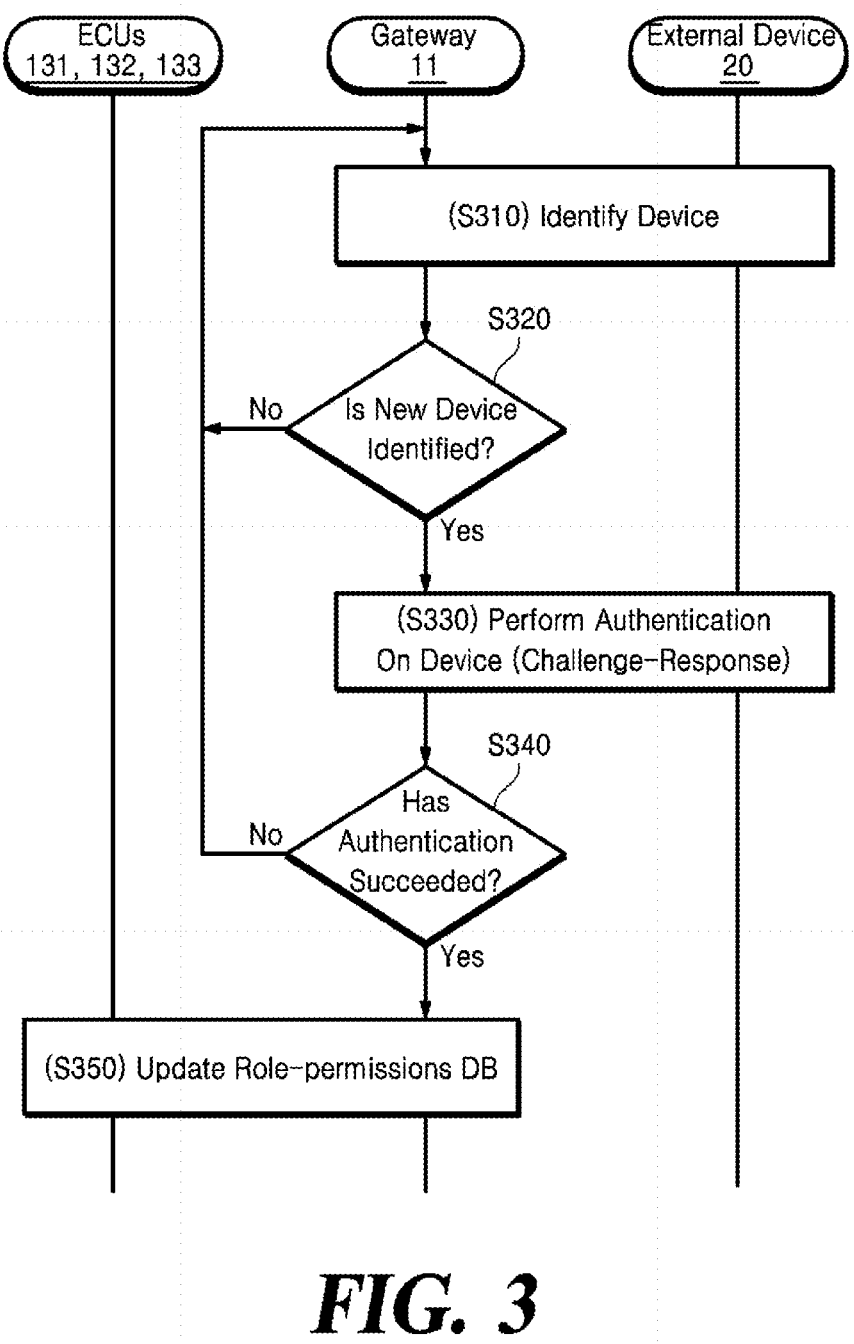
FIG. 3 is a flowchart of a public key certificate-based authentication procedure performed by a vehicle's gateway for an external device, according to at least an exemplary embodiment of the present disclosure.

FIG. 3 is a flowchart of a public key certificate-based authentication procedure performed by a vehicle's gateway 11 for an external device, according to at least an exemplary embodiment of the present disclosure.

The gateway 11 may hold in its internal secure repository (e.g., non-volatile memory in a TPM or HSM) a (first) role-permissions database defining predefined roles which may be assigned to external devices and permissions mapped to those roles, and the vehicle manufacturer's public key (or certificate including the public key). Furthermore, the ECUs that are endpoints of the in-vehicle network may also include a (second) role-permissions database defining the role-permissions mapping relationships associated with each ECU's domain. The ECU 131 is sufficient to have just the role-permissions relationships associated with its domain, and accordingly, the (second) role-permissions database managed by the ECU will typically be lighter than that of the gateway.

The gateway 11 may perform a component identification or device identification process to determine which devices are connected to the vehicle access interface when the vehicle starts up or during the operation of the vehicle (S310).

When a new external device 20 is discovered ("Yes" in S320), the gateway 11 may examine whether the external device 20 includes a valid device certificate. For example, to verify that the device certificate was issued by the VM authentication server, the gateway 11 may use the vehicle manufacturer's public key kept in a secure repository to verify that the digital signature of the root CA contained in the device certificate is indeed signed by the root CA (i.e., the vehicle manufacturer). As an exemplary embodiment of the present disclosure, the gateway 11 may verify, according to a hierarchical chain of trust, the digital signature of the CA (i.e., the device manufacturer) included in the device certificate and the digital signature of the root CA (i.e., the vehicle manufacturer) included in the device manufacturer's certificate.

The gateway 11 may perform a typical challenge-response authentication process on the external device 20 to verify that the latter possesses a private key corresponding to the public key included in the device certificate (S330). For example, the gateway 11 may send a challenge, which is a randomly generated value, to the external device 20 which may then encrypt the random value received from the gateway 11 with its private key and send a response message with the encrypted value (i.e., electronic signature data) attached. The gateway 11 may decrypt the electronic signature data by use of the public key contained in the device certificate of the external device 20, and compare the decrypted value to the challenge it had sent. The gateway 11 may be responsive to when the decrypted value equals the challenge for determining the authentication as being succeeded, and responsive to when the decrypted value is different from the challenge for determining the authentication as being failed.

When the authentication of the external device 20 is successful ("Yes" in S340), the gateway may be configured to determine the role of the external device 20 based on a role indicator contained in an extended field of the external device's certificate and may update the role-permissions database (S350). For example, the gateway 11 may associate the identifier of the authenticated external device 20 with one or more roles in the role-permissions database. Furthermore, the gateway 11 may distribute the "identifier and role indicator" or "identifier and one or more associated roles" of the authenticated external device 20 to the ECUs 131, 132, 133 on the in-vehicle network so that the ECUs 131, 132, 133 can update their possessed role-permissions database. For example, a renewal request message including the "identifier and role indicator" or "identifier and one or more associated roles" may be broadcast on one or more buses of the in-vehicle network.

Figure 4:
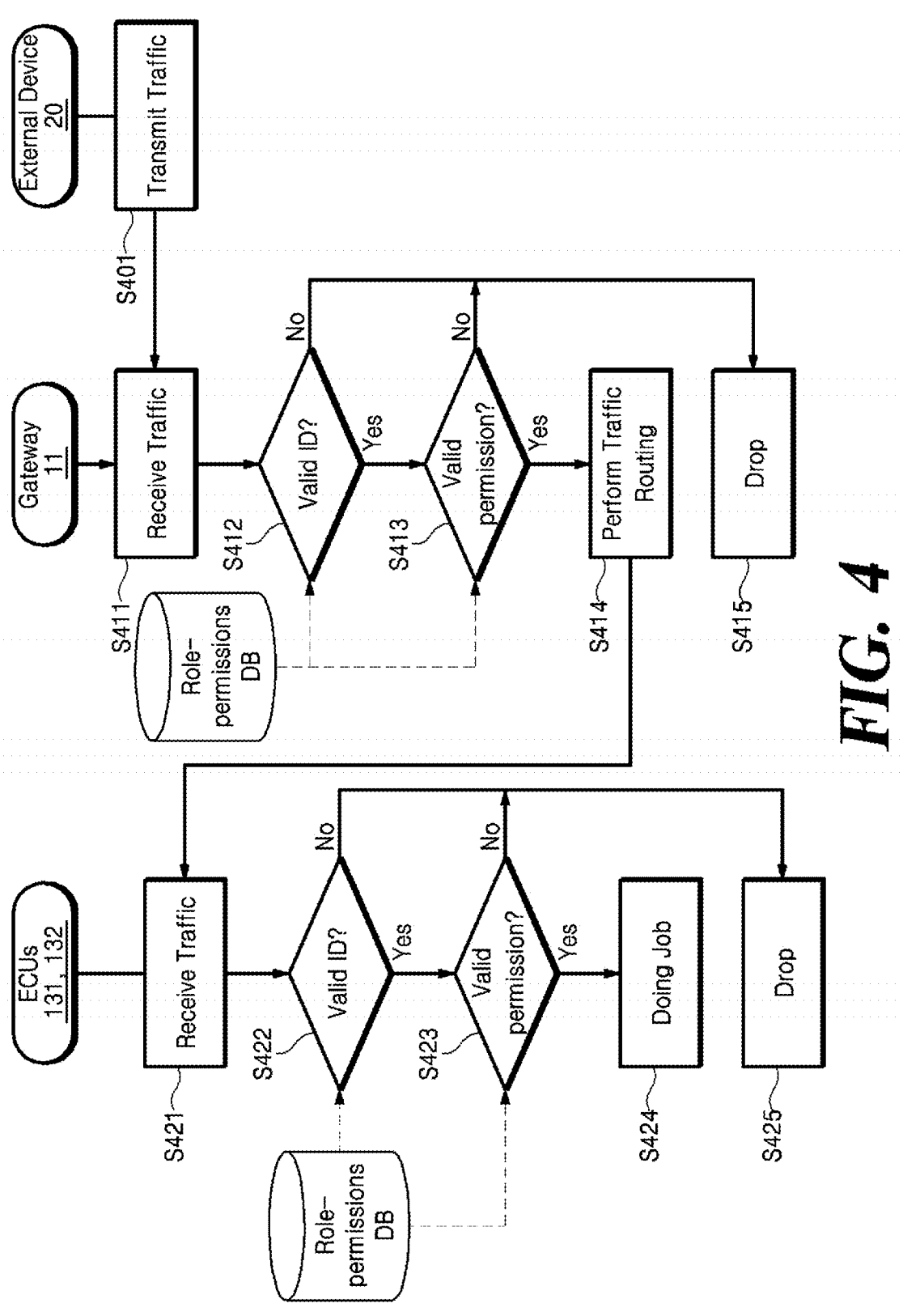
FIG. 4 is a flowchart of an authorization procedure for a vehicle's gateway to control communication traffic received from an external device and destined for the in-vehicle network, according to at least an exemplary embodiment of the present disclosure.

FIG. 4 is a flowchart of an authorization procedure for a vehicle's security system to determine whether to allow or block communication traffic received from an external device and destined for an in-vehicle network, according to at least an exemplary embodiment of the present disclosure.

The process begins with the gateway 11 receiving from the external device 20 communication traffic destined for the in-vehicle network (S401, S411). The gateway 11 may obtain from the communication traffic an identifier of the external device 20 which is the source of the communication traffic, and based on the identifier of the external device 20, the gateway 11 may query a role-permissions database stored in an internal secure repository (S412). In response to an absence of the identifier of the external device 20 associated with one or more roles in the role-permissions database ("No" in S412), the gateway 11 may be configured to determine that the external device 20 is not a previously authenticated device. When the external device 20 is not a previously authenticated device, the gateway 11 may ignore or drop the communication traffic received from the external device 20 (S415) and initiate the aforementioned authentication process in FIG. 3.

If the external device 20 is a previously authenticated device ("Yes" in S412), the gateway 11 may discover in the role-permissions database one or more roles mapped to the identifier of the external device 20 and the permissions corresponding to the roles ("Yes" in S413). Based on the permissions corresponding to the roles of the external device 20, the gateway 11 may block the routing of communication traffic from the external device 20 to unpermitted domains and route the communication traffic to relevant domains (S414). If the communication traffic is headed toward a domain which is not permitted to be accessed ("No" in S413), the gateway 11 may ignore or drop the communication traffic received from the external device 20 (S415).

Once the communication traffic is routed by the gateway 11 to the relevant domain, e.g., Bus #1 in FIG. 1, each of the ECUs, e.g., 131 and 132 in FIG. 1 within that domain may receive the communication traffic. In the example shown in FIG. 4, the ECUs 131, 132, upon receiving the communication traffic (S421), may obtain an identifier of the external device 20 which is the source of the communication traffic and may query the role-permissions database stored in its secure repository based on the identifier of the external device 20 to determine the role of the external device 20 and the authorization corresponding to that role. If no identifier of the external device 20 is found in the role-permissions database ("No" in S422) or the external device 20 does not have permission to access the ECUs 131, 132 ("No" in S423), the same units 131, 132 may ignore or drop the communication traffic (S425). If the external device 20 has permission to access the ECUs 131, 132 ("Yes" in S423), the same units 131, 132 may perform the required function or do the job for the communication traffic (S424).

The redundant performance of role-based access control (RBAC) by the gateway 11 and the electronic control units 131, 132, 133 is based on a defense-in-depth strategy. The electronic control unit can receive data directly from other electronic control units within its domain, bypassing a gateway, and the access control of the present disclosure is therefore useful as a backup solution to defend against attacks from other electronic control units that have been compromised by an attacker or connected to the bus without permissions.

It should be understood that the described example embodiments may be implemented in many different ways. In some examples, the various methods, gateways, and electronic control units described in the present disclosure may be implemented by a computing device or a special-purpose computing device including at least one processor and memory. Accordingly, the functions of the gateway and the electronic control unit described above may be implemented as instructions executed by at least one processor and may be implemented as a hardware circuit including semiconductors such as custom very-large-scale integration (VLSI) circuits or gate arrays, logic chips, and transistors. Additionally, the functions of the aforementioned gateway and electronic control unit may be implemented with programmable hardware devices such as a field programmable gate array (FPGA), programmable array logic, and programmable logic devices.

Meanwhile, various methods or functions described in various exemplary embodiments of the present disclosure may be implemented as instructions stored in a non-transitory recording medium which may be read and executed by one or more processors. The non-transitory recording medium includes, for example, all types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A gateway for managing security for an in-vehicle network, the gateway comprising:
   a hardware-based secure repository implemented using a trusted platform module (TPM) or a hardware security module (HSM) and configured to hold a public key and a role-permissions database of a vehicle manufacturer; and
   at least one processor physically integrated into a vehicle gateway electronic control unit and configured to perform routing of communication traffic between a vehicle access interface and the in-vehicle network,
   wherein the at least one processor is configured to:
      perform a challenge-response authentication process on an external device which is new and external to a vehicle and connected to the vehicle access interface, based on the public key of the vehicle manufacturer and a certificate of the external device,
      associate one or more roles in the role-permissions database with an identifier of the external device, based on a role indicator obtained from an extended field of the certificate of the external device,
      subsequently distribute, to electronic control units (ECUs) on the in-vehicle network, (i) the identifier and the role indicator or (ii) the identifier and the one or more roles of the external device, for causing the ECUs to update an ECU role-permissions database to be used for controlling access of the ECUs to the communication traffic, and
      control the routing of the communication traffic departing from the external device and headed to the in-vehicle network based on permissions mapped to the one or more roles in the role-permissions database.

2. The gateway of claim 1, wherein the at least one processor is further configured to block the routing of the communication traffic from the external device to unpermitted domains and to allow the routing of the communication traffic to relevant domains, based on permissions mapped to the one or more roles of the external device.

3. The gateway of claim 1, wherein the certificate of the external device includes a digital signature signed with a private key of the vehicle manufacturer.

4. The gateway of claim 1,
   wherein the certificate of the external device includes a digital signature signed with a private key of a device manufacturer that produced the external device, and
   wherein the device manufacturer and the vehicle manufacturer establish a chain of trust.

5. A method performed by a gateway for routing communication traffic between a vehicle access interface and an in-vehicle network, the gateway including a secure repository holding a public key and a role-permissions database of a vehicle manufacturer, the method comprising:
   detecting an external device which is new and external to a vehicle and connected to the vehicle access interface;
   performing a challenge-response authentication process on the external device based on the public key of the vehicle manufacturer and a certificate of the external device;
   obtaining a role indicator from an extended field of the certificate of the external device and associating, based on the role indicator, one or more roles in the role-permissions database with an identifier of the external device;
   distributing, to electronic control units (ECUs) on the in-vehicle network, (i) the identifier and the role indicator or (ii) the identifier and the one or more roles of the external device, for causing the ECUs to update an ECU role-permissions database to be used for controlling access of the ECUs to the communication traffic; and
   controlling the routing of the communication traffic departing from the external device and headed to the in-vehicle network based on permissions mapped to the one or more roles in the role-permissions database.

6. The method of claim 5, wherein the controlling of the routing of the communication traffic includes:
   blocking the routing of the communication traffic from the external device to unpermitted domains and allowing the routing of the communication traffic to relevant domains, based on permissions mapped to the one or more roles of the external device.

7. The method of claim 5, wherein the certificate of the external device includes a digital signature signed with a private key of the vehicle manufacturer.

8. The method of claim 5, wherein the certificate of the external device includes a digital signature signed with a private key of a device manufacturer that produced the external device, and wherein the device manufacturer and the vehicle manufacturer establish a chain of trust.

9. A vehicle security system, comprising:
   a plurality of electronic control units connected to one or more buses forming an in-vehicle network; and
   a gateway for managing communications between the plurality of electronic control units and an external network which is external to a vehicle,
   wherein the gateway includes:
      a secure repository holding a public key and a first role-permissions database of a vehicle manufacturer; and
      at least one processor configured to perform routing of communication traffic between a vehicle access interface and the in-vehicle network,
   wherein the at least one processor is configured to:

perform a challenge-response authentication process on an external device which is new and external to the vehicle and connected to the vehicle access interface, based on the public key of the vehicle manufacturer and a certificate of the external device, associate one or more roles in the first role-permissions database with an identifier of the external device, based on a role indicator obtained from an extended field of the certificate of the external device, subsequently distribute, to electronic control units (ECUs) on the in-vehicle network, (i) the identifier and the role indicator or (ii) the identifier and the one or more roles of the external device, for causing the ECUs to update an ECU role-permissions database to be used for controlling access of the ECUs to the communication traffic, and control the routing of the communication traffic departing from the external device and headed to the in-vehicle network based on permissions mapped to the one or more roles in the first role-permissions database.

10. The vehicle security system of claim 9, wherein the at least one processor is further configured to block the routing of the communication traffic from the external device to unpermitted domains and to allow the routing of the communication traffic to relevant domains, based on permissions mapped to the one or more roles of the external device.

11. The vehicle security system of claim 9, wherein the certificate of the external device includes a digital signature signed with a private key of the vehicle manufacturer.

12. The vehicle security system of claim 9, wherein the certificate of the external device includes a digital signature signed with a private key of a device manufacturer that produced the external device, and wherein the device manufacturer and the vehicle manufacturer establish a chain of trust.

13. The vehicle security system of claim 9, wherein the electronic control units on the in-vehicle network each include:

a secure repository holding second role-permissions database; and at least one processor configured to determine whether to drop the communication traffic received from the one or more buses, based on permissions mapped to the one or more roles in the second role-permissions database.

* * * * *